US007032012B2

(12) United States Patent
Roh

(10) Patent No.: US 7,032,012 B2
(45) Date of Patent: Apr. 18, 2006

(54) PPPOA SPOOFING IN POINT-TO-POINT PROTOCOL OVER ATM USING AN XDSL MODEM

(75) Inventor: Eung-Seok Roh, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 10/025,796

(22) Filed: Dec. 26, 2001

(65) Prior Publication Data

US 2003/0061321 A1 Mar. 27, 2003

Related U.S. Application Data

(60) Provisional application No. 60/316,282, filed on Sep. 4, 2001.

(51) Int. Cl.
*G06F 15/16* (2006.01)
*H04J 3/24* (2006.01)

(52) U.S. Cl. ....................... 709/220; 709/229; 370/475

(58) Field of Classification Search ................ 370/475, 370/352, 351; 709/229, 220, 111
See application file for complete search history.

(56) References Cited

U.S. PATENT DOCUMENTS

| | | | | |
|---|---|---|---|---|
| 6,028,848 | A | 2/2000 | Bhatia et al. | |
| 6,185,624 | B1 | 2/2001 | Fijolek et al. | |
| 6,480,508 | B1 * | 11/2002 | Mwikalo et al. | 370/475 |
| 6,778,528 | B1 * | 8/2004 | Blair et al. | 370/352 |
| 2001/0030977 | A1 * | 10/2001 | May | 370/475 |
| 2002/0062485 | A1 * | 5/2002 | Okano et al. | 725/111 |
| 2002/0095484 | A1 * | 7/2002 | Pagani et al. | 709/220 |
| 2003/0055990 | A1 * | 3/2003 | Cheline et al. | 709/229 |
| 2003/0198215 | A1 * | 10/2003 | Merrill et al. | 370/351 |

FOREIGN PATENT DOCUMENTS

| | | |
|---|---|---|
| JP | 11-275083 | 10/1999 |
| JP | 2001-016272 | 1/2001 |
| JP | 2001-160829 | 6/2001 |

OTHER PUBLICATIONS

Network Working Group Request for Comments: 2364 "PPP over AAL5", G. Gross et al., Jul. 1998.

(Continued)

*Primary Examiner*—John Follansbee
*Assistant Examiner*—Philip Lee
(74) *Attorney, Agent, or Firm*—Robert E. Bushnell, Esq.

(57) ABSTRACT

A PPPoA (point-to-point (PPP) over asynchronous transfer mode (ATM)) spoofing function utilizing an asymmetric digital subscriber line (ADSL) modem to form a single network between a client PC and a network access server (NAS) by allowing the ADSL modem to make a PPP connection to the NAS when the client PC is booted, by allowing the NAS to transmit Internet protocol (IP) configuration information, including a global IP address, to a DHCP server of the ADSL modem through a PPP Internet Protocol control protocol (IPCP), and by allowing the ADSL to transfer the IP configuration information received from the NAS to the client PC, thereby forming a bridge by the ADSL modem between the client PC and the NAS to enable IP packets to be transferred between the client PC and the NAS.

14 Claims, 4 Drawing Sheets

OTHER PUBLICATIONS

Point-to-Point Extensions Working Group Internet Draft of Jun. 20, 2001 "PPP over AAL2;", Bruce Thompson et al., Jun. 20, 2001.

Network Working Group Request for Comments: 2881 "Network Access Server Requirements Next Generation (NASREQNG) NAS Model", D. Mitton et al., Jul. 2000.

Network Working Group Request for Comments: 1332 "The PPP Internet Protocol Control Protocol (IPCP)", G. McGregor, May 1992.

Network Working Group Request for Comments: 1631 "The IP Network Address Translator (NAT)", K. Egevang et al., May 1994.

Network Working Group Request for Comments: 2516 "A Method for Transmitting PPP Over Ethernet (PPPoE)", L. Mamakos et al., Feb. 1999.

Network Working Group Request for Comments: 2131 "Dynamic Host Configuration Protocol", R. Droms, Mar. 1997.

* cited by examiner

PPPOA SPOOFING IN POINT-TO-POINT PROTOCOL OVER ATM USING AN XDSL MODEM

CLAIM OF PRIORITY

This application makes reference to, incorporates the same herein, a provisional patent application entitled Dynamic Host Setting Protocol Spoofing In The PPP Protocol Using Mode On An ATM Of xDSL Modem filed in the U.S. Patent and Trademark Office on 4 Sep. 2001, and assigned Ser. No. 60/316,282 by that Office.

BACK GROUND OF THE INVENTION

1. Field of the Invention

The present invention relates to Point-to-Point Protocol (PPP) spoofing in Internet communications, and in particular, PPPoA spoofing using PPPoA (point-to-point protocol over asynchronous transfer mode (ATM)) in an xDSL modem.

2. Description of the Related Art

The acronym xDSL is a general term to refer to all types (protocols) of digital subscriber lines (DSL) such as, an asymmetric digital subscriber line (ADSL), a single-line digital subscribe line (SDSL), a very high digital subscriber line (VDSL), a high-bit-rate digital subscriber line (HDSL), a universal digital subscriber line (UDSL), an integrated services digital network digital subscriber line (IDSL), and a rate adaptive digital subscriber line (RADSL). A DSL modem bridges or routes (connects) a user's personal computer (PC) to an Internet provider or Internet service provider (ISP).

The digital subscriber line connects a digital circuit network at a subscriber's site to an Internet service provider (ISP) through an analog telephone line. Since the digital subscriber line provides a plurality of separate channels used for transmission of audio telephone signals, such as audio sound, fax, etc., the digital subscriber line serves high speed data communications to be transmitted and received or both the audio telephone signals and the high speed data communications to be simultaneously transmitted and received through the conventional telephone line.

The digital subscriber line assigns a first frequency range from 0 kilo-Hertz (KHz) to 4 KHz to the analog audio signals (POTS: "plain old telephone service") and a second frequency range from 4 KHz to 2.2 mega-hertz (MHz) to the data communications.

A conventional modem cannot be simultaneously used for both audio telephone signal transmission and data communication. An integrated services digital network (ISDN) can be simultaneously used for both the audio telephone signal transmission and the data communication, but the communication and transmission speed is lowered. See U.S. Pat. No. 6,028,848 to Rajiv Bhatia et al. entitled Apparatus And Method For Use Therein For An ISDN LAN Modem Utilizing Internal DNS And DHCP Servers For Transparent Translation Of Local Host Names To IP Addresses, incorporated by reference.

The xDSL, however, enables the high speed data communication along with the audio telephone signal transmission because the audio telephone signal transmission occupies the lower frequency range while the high speed data communication occupies the higher frequency range. Any crosstalk and interference is prevented, and the communication and transmission speed is not lowered.

Another type modem is the cable modem used for Internet access over a cable television system (CATV), and some use the coax cable for downstream communication and telephone pair cables for upstream communication. See, for example, U.S. Pat. No. 6,185,624 to John G. Fijolek et al. entitled Method And System For Cable Modem Management Of A Data-Over-Cable System, incorporated by reference.

The ADSL denotes the asymmetric digital subscriber line since the data exchanging speed between a telephone station and a subscriber is different from each other. FIG. 1 shows the allocation of an audio telephone signal and an ADSL signal transmitted through the conventional telephone line. As shown in FIG. 1, the ADSL uses the downstream data channel having a wide frequency band rather than the upstream data channel. Although the communication speed is three times lower than the CATV system providing the capability of the high speed data communication having the same communication speed of the downstream data channel and the upstream data channel, the communication speed is not lowered when the number of subscribers increases. The communication speed of a subscriber using the ADSL is up to 12 megabits per second.

FIG. 2 shows an ADSL network using point-to-point protocol over ATM (PPPoA). See Network Working Group Request for Comments: 2364 "PPP over AAL5" and Point-to-Point Extensions Working Group Internet Draft of Jun. 20, 2001 "PPP over AAL2."

In FIG. 2 there are two different networks between a network access server (NAS: see Network Working Group Request for Comments: 2881 "Network Access Server Requirements Next Generation (NASREQNG) NAS Model") 40 and the client PC 10. There is a public network (Global IP address: 200.0.0.0) between the network access server and an ADSL modem 20 and a private network (local IP address: 10.0.0.0) between the client PC 10 and the ADSL modem 20.

An IP Network Address Translator (NAT: see Network Working Group Request for Comments: 1631 (RFC1631)) is used for address translation between a local Internet protocol (IP) address (used for local area networks (LAN)) and an IP global address (used for Internet access) on the ADSL modem 20. The local IP address and a gateway IP address are brought to the ADSL modem 20 and are set as WAN (wide area network) port information after the ADSL modem 20 is PPP-connected to the NAS 40 through PPP layer on the ADSL modem 20.

A user should input into the client PC 10 a local IP address and a subnet MASK as IP configuration information, and one or two domain name service (DNS) server Addresses and an ADSL modem 20's local IP address as a gateway IP address. When the client PC 10 communicates with the NAS 40, the IP address is routed by the NAT in the ADSL modem 20 and translated into the global IP address to connect with the NAS 40 via the digital subscriber line access multiplexer (DSLAM) 30. The NAS 40 is a computer server that is an Internet service provider (ISP) to provide connected customers with Internet access.

Problems with the system of FIG. 2 are discussed below. The NAT is used for routing the two different networks between the NAS 40 and the client PC 10 on the ADSL. Therefore, there exist the following limitations on the NAT as described in RFC1631:

(a) The performance decreases in response to a large increase in the number of entries in the NAT table. Each NAT has a table consisting of pairs of local IP addresses and global IP addresses. The IP addresses are not globally unique;
(b) The possibility of mis-addressing increases;
(c) The problems in using a particular application having the IP address on IP packet payload occur when the NAT is used. It breaks certain applications (or at least makes them more difficult to run);
(d) It hides the identity of hosts. While this has the benefit of privacy, it is generally a negative effect; and
(e) Some problems with SNMP, DNS, etc.

Even if the client PC 10 is turned off, the client ADSL is in the state of power on, thus the NAS 40 can neither withdraw the global IP address which was assigned to the user. Therefore the NAS 40 can not assign to another user the same global IP address. Accordingly, the system shown in FIG. 2 fails to provide a sufficient solution to the IP address depletion problem (RFC1631).

The user should reset the IP configuration, such as the IP address, the gateway address, the subnet mask, and the DNS server address, at least once.

If the ISP provides a PPP over Ethernet (PPPOE: Network Working Group Request for Comments: 2516), which does not have the problems mentioned above in the PPPoA mode, the following problems occur:

(a) The user needs to install Internet connection software having a PPPoE driver in the user's computer (client PC 10);
(b) The ISP and the user additionally pay for the Internet connection software;
(c) The user should reinstall the software in the user's computer when the private files and the public files for the Internet connection software are deleted;
(d) Even if reinstalled, the public files used in the Internet connection software has shown conflict problems with other applications. Therefore, the problems burden the ISP with after-services for removing the conflict problems from the software;
(e) The user's PC needs to allocate resources within the client PC 10 for the Internet connection software, and the Internet connection software must be loaded before the Internet connection; and
(f) The user needs to keep the ID and the password for the Internet connection software confidential with the user's risk. The ID and the password may be exposed to any user of the PC.

SUMMARY OF THE INVENTION

It is therefore, an object of the present invention to provide a single network between the NAS and the client PC. The NAT which is used for routing another different network, is removed from the ADSL modem. Therefore, the global IP address and the gateway IP address, which is obtained when the ADSL modem is PPP-connected to the NAS, is transferred from the ADSL to the client PC.

In order to achieve the foregoing object, and further objects, of the present invention, a dynamic host configuration protocol (DHCP: see Network Working Group Request for Comments: 2131 "Dynamic Host Configuration Protocol", R. Droms, March 1997) server is implemented into the ADSL modem. The ADSL modem which implements the function of a bridge between the NAS and the client PC , transfers data between the NAS and the client PC. Therefore the ADSL is improved in performance.

The DHCP of the ADSL modem acts as a server with respect to the DHCP client contained in the operating system of the client PC. It is advantageous that the user does not have to directly reset the IP configuration. The ADSL Modem does not need to additionally have the IP address because the global IP address obtained from the NAS is used in the client PC. If one of the ADSL modem and the client PC is turned off, the global address of the client PC, which is dynamically assigned by the NAS, is withdrawn. Thus the number of global IP addresses issued from the NAS is reduced.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF THE REFERRED EMBODIMENT

Figure 1:
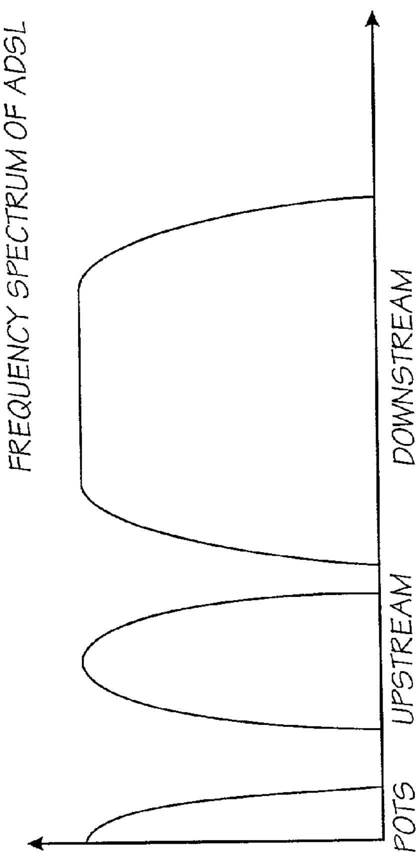
FIG. 1 shows the frequency spectrum of an audio telephone signal and an ADSL signal transmitted through a conventional telephone line.
Figure 2:
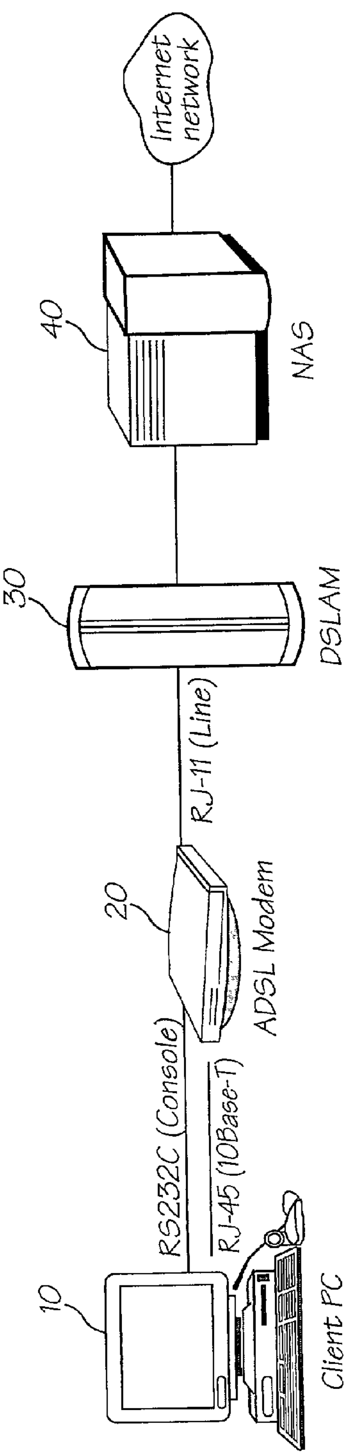
FIG. 2 shows an ADSL network using point-to-point protocol over ATM (PPPoA)
Figure 3:
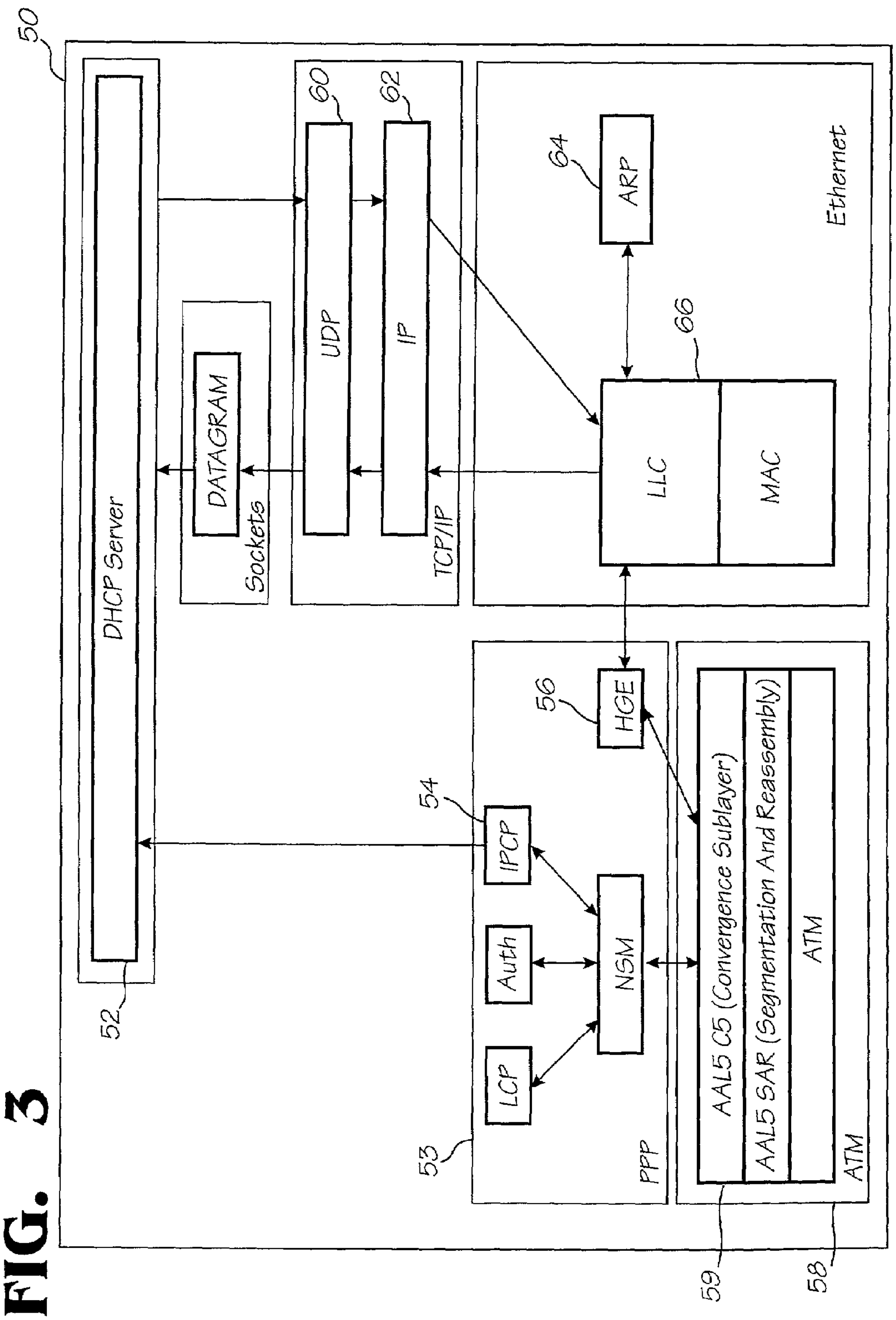
FIG. 3 shows a protocol structure and a data flow in the ADSL modem using DHCP according to the principles of the present invention.

FIG. 3 shows protocol stacks (layers) and a data flow in the inventive ADSL modem, as follows

| | |
|---|---|
| DHCP—Dynamic Host Configuration Protocol | NSM—Negotiation State Machine |
| HGE—Header Generation/Extraction | LCP—Link Control Protocol |
| AUTH—Authentication | IPCP—Internet Protocol Control Protocol |
| ATM—Asynchronous Transfer Mode | UDP—User Datagram Protocol |
| IP—Internet Protocol | PPP—Point-to-Point Protocol |
| LLC—Logical Link Control | MAC—Media Access Control |
| ARP1—Address Resolution Protocol | AAL—ATM Adaption Layer |

Each element in the ADSL modem 50 listed above, except the DHCP, is well known in the art and need not be explained in detail. The present invention removes the NAT from the ADSL modem 50, and instead, as shown in FIG. 3, adds a Dynamic Host Configuration Protocol (DHCP) server 52.

DHCP is a communications protocol that lets network administrators manage centrally and automate the assignment of Internet Protocol (IP) addresses in an organization's network. Using the Internet Protocol, each machine that can connect to the Internet needs a unique IP address. When an organization sets up its computer users with a connection to the Internet, an IP address must be assigned to each machine. Without DHCP, the IP address must be entered manually at each computer and, if computers move to another location in another part of the network, a new IP address must be entered. DHCP lets a network administrator supervise and distribute IP addresses from a central point and automatically sends a new IP address when a computer is plugged into a different place in the network.

The IP configuration, which is needed in the client PC 10, is transferred to the DHCP server 52 on the conventional PPP layer 53. The HGE 56 is added to remove a PPP header because the PPP communication for transferring the IP packet in the ADSL modem 50 is performed between the NAS 40 and the ADSL modem 50.

Figure 4:
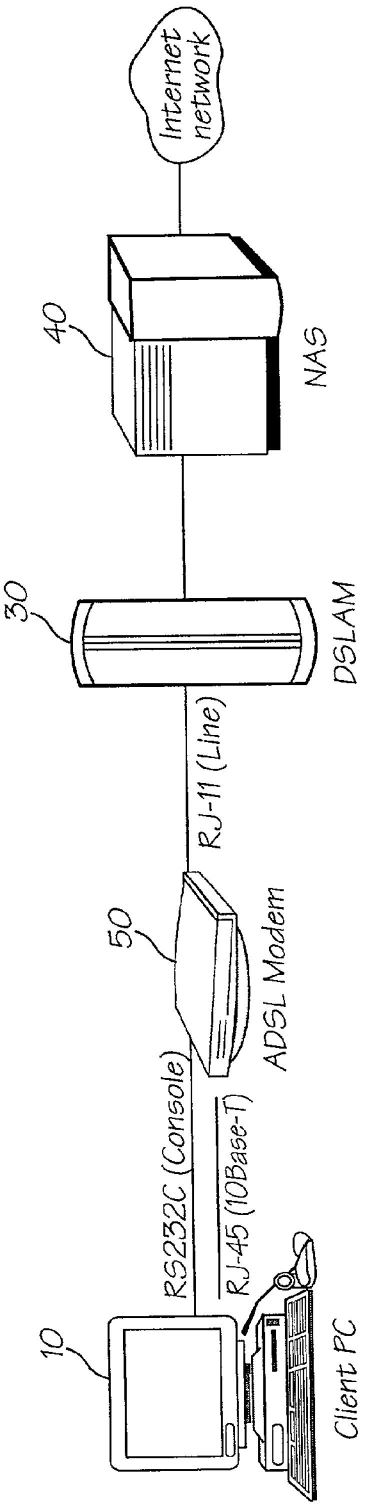
FIG. 4 shows a network structure of the ADSL modem using PPPoA spoofing according is to the principles of the present invention.

FIG. 4 shows a network structure of the ADSL modem 50 using PPPOA spoofing in the PPPoA mode. A single network is formed between the NAS 40 and the client PC 10 because the global IP address obtained from the NAS 40 is transferred to the client PC 10 through the IPCP 54 (FIG. 3) of the PPP layer 53 and DHCP Server 52 (FIG. 3) of the ADSL modem 50. IPCP 54 is discussed in Network Working Group Request for Comments: 1332 "The PPP Internet Protocol Control Protocol (IPCP)," G. McGregor, May 1992. In FIG. 4, there exists a public network (200.0.0.0) between the NAS 40 and the client PC 10 as an example.

When booted, a DHCP client of the application layer 100 (see FIG. 7) in client PC 10 broadcasts a DHCPDISCOVER packet (see FIG. 5) to the network to locate a DHCP server. Since the only DHCP server to be encountered is DHCP server 52 in the ADSL modem 50, the DHCP server 52, receiving the DHCPDISCOVER packet, operates a PPP session to be opened to both the NAS 40 and the ADSL modem 50 and obtains from the IPCP 54 the IP configuration information, such as the global IP address, the gateway IP address, and the DNS server address.

In response to the DHCPDISCOVER packet, the ADSL modem 50 sends to the DHCP client a subnet mask packeted into a DHCPOFFER and a DHCPACK packet along with the IP configuration information received from the NAS 40. The DHCP client of the client PC 10 sets the IP configuration information into the client PC 10 in response to the DHCPACK.

Since the single network is formed between the NAS 40 and the client PC 10 by setting the IP configuration information into the client PC 10, the bridging operation performs without an additional routing process of the ADSL modem 50 during the communication between the client PC 10 and the NAS 40.

If there is no DHCPREQUEST from the client PC 10 to renew a lease time of the global IP address during a predetermined period of time (lease time×3), the DHCP server 52 terminates the PPP-session connected to the client PC 10 and withdraws the global IP address from the client PC 10. Each step of the process is described in detail as follows:

(1) When the ADSL modem 50 is booted, the DHCP server 52 is ready to provide a service.

(2) After the client PC 10 is booted, the following operations are performed:

(a) The DHCP client contained in the operating system of the client PC 10 is activated and broadcasts a DHCPDISCOVER packet to seek a DHCP server 52;

(b) The DHCP server 52 of the ADSL modem 50 activates the process for opening the PPP session between the NAS 40 and the ADSL modem 50 in response to the receipt of the DHCPDISCOVER packet;

(c) After the PPP session is connected, the IPCP 54 obtains the IP configuration information including the IP address, the gateway IP address, and the DNS server address, all of which are used in the client PC 10. Although the algorithm and flow for processing the IPCP 54 utilizes the conventional system, a primary-DNS-address and a secondary-DNS-address are added to the system when the ADSL modem 50 sends the NAS 40 a configuration-request. The NAS 40 responds to the ADSL modem 50 and processes the configuration-request. The configuration IP information received from the NAS 40 is as follows:

Local IP address: a global address assigned to the client PC 10 by the NAS 40;

Remote IP address: the gateway IP address assigned to the Client PC 10 which is the IP address of the NAS 40 with which the client PC 10 corresponds to the NAS 40 having the gateway IP address; and DNS Server address: The ADSL modem 50 requests the NAS 40 to send to the ADSL both a primary-DNS-address and a secondary-DNS-address. If the ADSL can not receive the primary-DNS-address and the secondary-DNS-address from the NAS 40 because the NAS 40 is not set to issue the primary-DNS-address and a secondary-DNS-address, the DNS server address stored in a flash memory (not shown) of the ADSL modem 50 is used as the DNS server address;

(d) In the above item (1), the IPCP 54 transfers the IP configuration information to the DHCP server 52 of the ADSL modem 50;

(e) The DHCP server 52 of the ADSL modem 50 transfers to the client PC 10 the related information of the IP configuration information including a default address of the ADSL modem 50 through the DHCPOFFER packet in response to the DHCPDISCOVER packet. The packet transferred to the client PC 10 includes the following:

the global address, the gateway address, and the DNS server address (including the primary-DNS-address and secondary-DNS-address if available) obtained from the NAS 40;

values for lease time, lease renewal time (T1) and lease renewal time (T2). (A period of 5 seconds is reasonable for promptly applying the values of the above item (c) in the client PC 10 according to the test result.); and a minimum value of the subnet mask assembled from the gateway IP address and the global IP address.

a routine for producing a Subset Mask

```
for (int n__count 31; n__count >0 n__count –) {
   If ((Global__IP__Address >>n__count) !=
   (Gateway__IP__Address >> n__count)) {
      n__count ++;
      break;
   }
}
subMask = (O×FFFFFFFF >> n__count);
subMask = (subMask << n__count);
```

(f) The client PC 10 broadcasts the DHCPREQUEST packet in response to the DHCPOFFER packet;

(g) In response to the DHCPREQUEST packet, the DHCP server 52 of the ADSL modem 50 sends to the Unicast Ethernet Address of the client PC 10 the IP configuration information which has been obtained in the above step (e) and is loaded in the DHCPACK packet;

(h) The DHCP client of the client PC 10 installs the IP configuration information into the client PC 10 in response to the DHCPACK packet;

(i) The ARP (Address Resolution Protocol 64) process along with the above message processing steps is similar to the conventional process, and the DHCP message process performs in accordance with the RFC2131.

ARP process:

if (packet is ARP request about gateway)

ARP reply sending (Make packet: PC GATEWAY IP and ADSL Modem 50 hardware address mapping)

Figure 5:
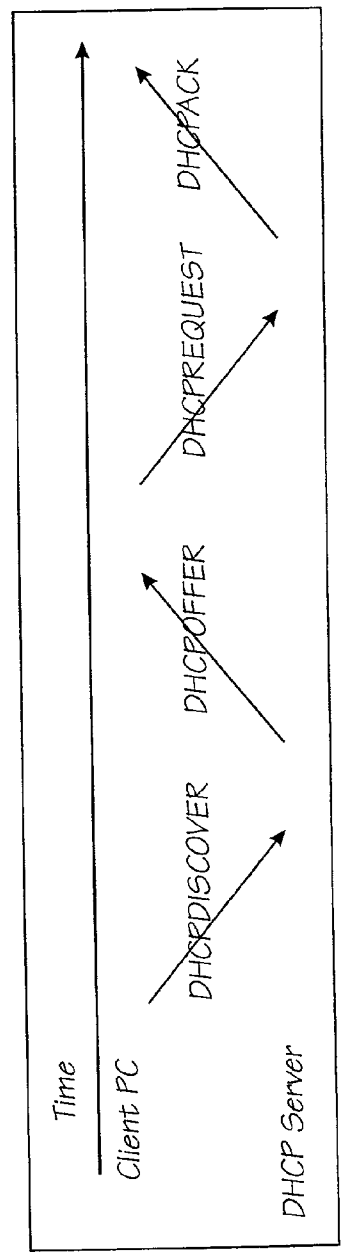
FIG. 5 shows a flow for processing the DHCP message according to the principles of the us present invention.

DHCP message process:

FIG. 5 shows a flow for processing A DHCP message;

(j) The DHCP client of the client PC 10 sends a DHCPREQUEST packet to the Default IP address of the ADSL modem 50 to obtain a new lease time after the lease renewal time passes; and (k) In response to the DHCPREQUEST packet from the DHCP client of the client PC 10, the DHCP server 52 of the ADSL modem 50 sends the DHCPACK packet, which is similar to the DHCPACK packet of the above step (g), to the Unicast Ethernet Address corresponding to the client PC 10.

(3) The following process shows the processing of the DHCP packet in the ADSL modem 50 corresponding to the above described item (2):

(a) In a routine processing all the frames received from the client PC 10 in the LLC 66, a Data Link Layer of the ADSL modem 50:

if it is the DHCP packet, an upper layer is loaded to the DHCP packet as a socket to allow the DHCP server 52 task to receive and process the DHCP packet.

else

IP packet processing is performed.

(b) In a routine processing the socket in the DHCP server 52 task, a predetermined processing routine is chosen depending on a message type. A received packet is the DHCP data packet excluding an IP header and a UDP (60) header.

EXAMPLES

If it is the DHCPDISCOVER packet, a discover function for making and sending out the DHCPOFFER packet is cited.

If it is the DHCPREQUEST packet, a request function for making and sending out the DHCPACK or the DHCPNAK packet is cited.

(c) In a function for sending the DHCP packet:

the UDP and the IP address are added. The IP address is the Default IP address of the ADSL modem 50.

The packet is sent to the lower layer; data link layer.

(4) The dataprocessing flow in the ADSL modem 50 in response to the IP packet transmitted from the client PC 10 is described as follows.

(a) In the routine processing all the frames received from the client PC 10 in the Data link layer of the ADSL modem 50:

if it is the DHCP packet is checked.

the packet is loaded to an upper layer to allow the DHCP server 52 task to receive and process the packet as a socket.

else /* the packet other than the DHCP*/ EtherRxMsg function is cited.

(b) In the EtherRxMsg function, the corresponding frame is sent as a queue.

(c) In the EtherRxMsg function receiving and processing the frame inserted in the queue of the above step(b), if the frame type is the ARP, the ARP processing routine is cited.

else if the frame type is the IP packet, a user_ip_sys function is cited to process the frame.

(d) The user_ip_sys function as a function of the HGE module 56 of the PPP layer 53 of the ADSL modem 50, generates the PPP header. And then the PPP frame is transmitted to the ATM layer 58 to send the ATM cell to the NAS 40 through the ATM SAR (AAL5 Segmentation and Reasembly layer)59.

(5) The data processing flow in the ADSL modem 50 in response to the IP packet transmitted from the NAS 40 is described as follows.

(a) All the data frame received from the NAS 40 in the ATM layer of the ADSL modem 50 is sent a queue to be processed in the PPP layer.

(b) In a routine of receiving in the PPP layer and processing the data frame inserted into the queue as described in the above step (a), If the protocol of the PPP header is the PPP IP, {

The RIP packet is discarded.

The PPP header is removed. (as an extraction function of the PPP header in HGE module in the PPP layer 53 of the ADSL modem 50.)

The SendMsg2Ether Tx function is cited.

} else

PPP negotiation is performed as the conventional system does.

(c) The frame is transmitted to the Data Link Layer to send the frame to the client PC 10 in the SendMsg2Ether Tx function.

(6) The following process is performed when the client PC 10 is shut down.

(a) The DHCP server 52 cannot receive the DHCPREQUEST packet from the client PC 10 during a predetermined period of time (Lease_time×3) because the client PC 10 is shut-down.

(b) Then the DHCP server 52 terminates the PPP session connected to the client PC 10 and withdraws the global IP address assigned to the client PC 10.

Figure 6:
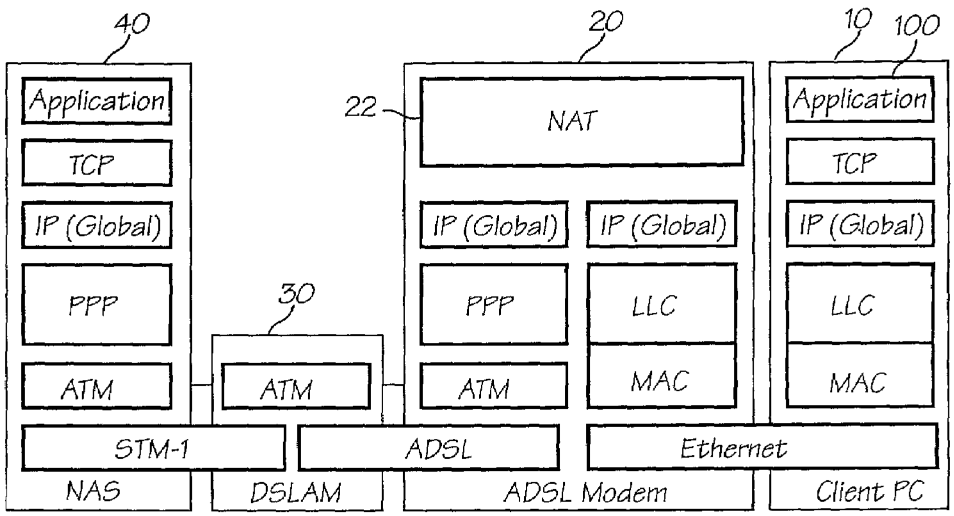
FIG. 6 shows protocol stacks of the conventional network using the NAT in a PPPoA mode.

FIG. 6 shows the protocol layers of the conventional network using the NAT 22 in a PPPoA mode.

The global IP address provided by the NAS 40 or the ISP is assigned as an IP address for the WAN port of the ADSL modem 20. The IP address for the LAN port of the ADSL modem 20 becomes the gateway IP address of local network same as the client PC 10, the local IP address of the client PC 10 is changed to the global IP address by the NAT 22 of the ADSL Modem 20. The global IP address obtained from the IP packet transmitted from the NAS 40 is changed to the local IP address of the client PC 10 address by the NAT 22 of the ADSL Modem 20, too. And the ADSL modem 20 adds the PPP header information to the IP packet when the IP packet is transferred from the client PC 10 to the NAS 40 and removes the PPP header information from the IP packet when the IP packet is transferred from the NAS 40 to the client PC 10.

Figure 7:
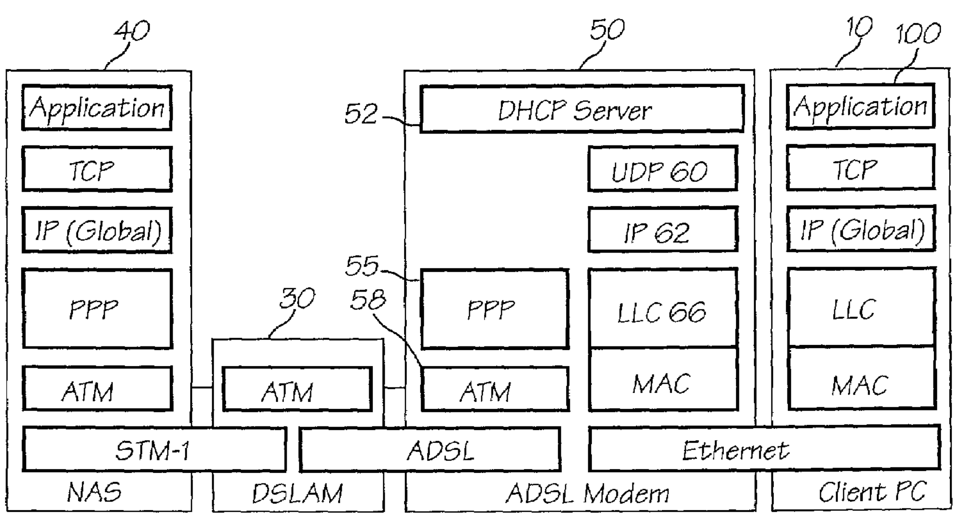
FIG. 7 shows protocol stacks of the network constructed according to the principles of the present invention using a PPPOA spoofing function.

FIG. 7 shows the protocol layers of the network constructed according to the principles of the present invention using a PPPOA spoofing function in the PPPoA mode.

The IP configuration information obtained from the NAS 40 through PPP connection is transferred to the DHCP server 52 in the ADSL modem 50. The DHCP server 52 transmits the IP configuration information to the client PC 10. Since a single network forms between the client PC 10 and the NAS 40, the conventional routing process (IP address translation) is not needed in the ADSL modem 50 during communication between the client PC 10 and the NAS 40, but the bridging function is performed.

According to the aspects of the invention described above, after booting, the client PC 10 is connected to the Internet without changing and installing Internet connection software. All problems caused by the user's mishandling and mistaking of the client PC 10 are removed. The ADSL modem 50 does not need the NAT 22 of FIG. 6 (network address translation) and its inherent limitations. Because the network address translation is not used in the ADSL modem 50, the ADSL modem 50 has an improved performance.

The ADSL modem 50 constructed according to the principles of the present invention shows download and upload speeds which are improved by about 33% compared to the conventional ADSL modem having the NAT 22 of FIG. 6, as shown in table 1. The test results depicted in table 1 represents the uploading and downloading speeds of a single file. Although the performance of the downloading and uploading speeds in the conventional ADSL modem 20 having the NAT is lowered in a long-run test, the ADSL modem 50 constructed according to the present invention does not show any change in the performance of the downloading and uploading speeds during the long-run test.

TABLE 1

The average speed per a second of the test result when a file having 100M in size is downloaded, and when another file having 10M in size is uploaded.

| | The conventional method using the NAT -Actual Link Rate- Down: 8.8M Up: 704K | The PPPoA Spoofing method of the present invention -Actual Link Rate- Down: 8.54M Up: 726K |
|---|---|---|
| TEST 1 | 5.42M (Down) | 7.20M (Down) |
| TEST 2 | 5.40M (Down) | 7.12M (Down) |
| TEST 3 | 5.41M (Down) | 7.24M (Down) |
| TEST 4 | 643.24K (Up) | 699.09K (Up) |
| TEST 5 | 666.73K (Up) | 701.02K (Up) |

A single network is formed between the NAS 40 and the client PC 10. Since the client PC 10 is able to use the global IP address and the DNS server address provided by the NAS 40, any other additional local IP address is not needed. Therefore, the user does not have to manage any other additional IP address.

The global IP address is withdrawn when any one of the ADSL modem 50 and the client PC 10 is turned off, or when a lease time expires. Therefore, the number of global IP addresses issued by the NAS 40 decreases.

The DHCP server 52 of the ADSL modem 50 does not need the IP Pool because the DHCP server 52 performs a PPPoA spoofing function for obtaining automatically and dynamically the IP configuration information from the NAS 40 through PPP IPCP 54. Therefore, the user does not have to manage the IP Pool of the DHCP server 52.

What is claimed is:

1. A method of a PPPoA (point-to-point (PPP) over asynchronous transfer mode (ATM)) spoofing function in an asymmetric digital subscriber line (ADSL) modem, comprising the steps of:

forming a single network between a client personal computer (PC) and a network access server (NAS) by allowing the ADSL modem to make a PPP connection to the NAS when the client PC is booted, by allowing the NAS to transmit Internet protocol (IP) configuration information, including a global IP address, to a DHCP server of the ADSL modem through a PPP Internet protocol control protocol (IPCP), and by allowing the ADSL modem to transfer the IP configuration information received from the NAS to the client PC;

forming a bridge by the ADSL modem between the client PC and the NAS and transferring IP packets between the client PC and the NAS; and allowing the NAS to withdraw the global IP address assigned to the client PC when one of the client PC and the ADSL modem is turned off.

2. The method as set forth in claim 1, the step of forming a single network comprising a step of producing a minimum subnet mask consisting of the global IP address and a gateway address.

3. The method as set forth in claim 1, the step of transferring IP packets between the client PC and the NAS comprising the steps of:

allowing the NAS to add a PPP header to the IP packet when the IP packet is transferred from the client PC to the NAS; and allowing the ADSL modem to delete the PPP header from the IP packet when the IP packet is transferred from the NAS to the client PC.

4. The method as set forth in claim 1, the step of forming a single network comprising the steps of:

sending a DHCPDISCOVER message to the ADSL modem from the client PC;

sending a DHCPOFFER message to the client PC from the ADSL modem in response to the DHCPDISCOVER message, said DHCPOFFER message including said IP configuration information.

5. The method as set forth in claim 1, further comprising the steps of:

sending a DHCPREQUEST message to the ADSL modem to obtain a new lease time to prevent the NAS from withdrawing the global IP address assigned to the client PC after a lease renewal time expires; and sending a DHCPACK message from the ADSL modem to the client PC, said DHCPACK message including said IP configuration information.

6. An apparatus for performing a PPPoA (point-to-point (PPP) over asynchronous transfer mode (ATM)) spoofing function in a PPPoA system, comprising:

a client personal computer (PC);

an network access server (NAS); and an asymmetric digital subscriber line (ADSL) modem including:

an ATM layer, a PPP layer, an Internet protocol (IP) layer, a user datagram protocol (UDP) layer and a DHCP server, said ADSL modem completing a single network connection between said client PC and said NAS by forming a PPP connection to said NAS when said client PC is booted, by receiving at said DHCP server, through an Internet Protocol control protocol (IPCP) of said PPP layer, IP configuration information, including a global IP address transmitted from said NAS, and by transferring the IP configuration information received from the NAS to the client PC to enable said ADSL modem to form a bridge between said client PC and said NAS to allow IP packets to be transferred between said client PC and said NAS.

7. The apparatus as set forth in claim 6, wherein said NAS withdraws the global IP address assigned to the client PC when one of the client PC and the ADSL modem is turned off.

8. The apparatus as set forth in claim 6, wherein said IP configuration information includes a subnet mask consisting of said global IP address and a gateway address.

9. The apparatus as set forth in claim 6, wherein a header generation/extraction (HGE) portion of said PPP layer of said ADSL modem adds a PPP header to the IP packet when the IP packet is transferred from the client PC to the NAS; and a header generation/extraction (HGE) portion of said PPP layer of said ADSL modem deletes the PPP header from the IP packet when the IP packet is transferred from the NAS to the client PC.

10. The apparatus as set forth in claim 6, wherein said client PC sends a DHCPDISCOVER message to the ADSL modem, and said DHCP server sends a DHCPOFFER message to said client PC in response to the DHCPDISCOVER message, said DHCPOFFER message including said IP configuration information.

11. The apparatus as set forth in claim 6, wherein said client PC sends a DHCPREQUEST message to the ADSL modem to obtain a new lease time to prevent the NAS from withdrawing the global IP address assigned to the client PC after a lease renewal time expires, and said DHCP server sends a DHCPACK message to the client PC in response to the DHCPREQUEST message, said DHCPACK message including said IP configuration information to allow said lease time to be renewed.

12. The apparatus as set forth in claim 6, wherein said NAS withdraws the global IP address assigned to the client PC when a lease time expires.

13. The apparatus as set forth in claim 12, wherein said client PC sends a DHCPREQUEST message to the ADSL modem to obtain a new lease time to prevent the NAS from withdrawing the global IP address assigned to the client PC after a lease renewal time expires, and said DHCP server sends a DHCPACK message to the client PC in response to the DHCPREQUEST message, said DHCPACK message including said IP configuration information to allow said lease time to be renewed.

14. The apparatus as set forth in claim 6, wherein said IP configuration information includes a domain name system (DNS) server address consisting of a primary-DNS-address and a secondary-DNS-address.

* * * * *